(12) United States Patent
Emura et al.

(10) Patent No.: US 9,676,447 B2
(45) Date of Patent: Jun. 13, 2017

(54) FRONT DERAILLEUR

(71) Applicant: Shimano Inc., Sakai, Osaka (JP)

(72) Inventors: Atsuhiro Emura, Osaka (JP); Kenkichi Inoue, Osaka (JP); Tomohiro Niimi, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 14/959,030

(22) Filed: Dec. 4, 2015

(65) Prior Publication Data
US 2016/0083046 A1 Mar. 24, 2016

Related U.S. Application Data

(63) Continuation of application No. 13/900,787, filed on May 23, 2013, now Pat. No. 9,216,794.

(51) Int. Cl.
*B62M 9/134* (2010.01)
*B62M 9/137* (2010.01)

(52) U.S. Cl.
CPC ............ *B62M 9/134* (2013.01); *B62M 9/137* (2013.01)

(58) Field of Classification Search
CPC .............................. B62M 9/137; B62M 9/134
USPC ....................................... 474/80, 82
See application file for complete search history.

(56) References Cited

U.S. PATENT DOCUMENTS

| | | | | |
|---|---|---|---|---|
| 5,496,222 A | * | 3/1996 | Kojima | B62M 9/1342 474/80 |
| 5,779,580 A | * | 7/1998 | White | B62M 9/1342 474/80 |
| 6,099,425 A | * | 8/2000 | Kondo | B62M 9/1342 474/127 |
| 6,234,927 B1 | * | 5/2001 | Peng | B62M 9/1342 474/80 |
| 6,341,538 B1 | * | 1/2002 | Takachi | B62M 9/137 188/24.19 |
| 6,443,032 B1 | * | 9/2002 | Fujii | B62M 9/04 474/82 |
| 7,024,959 B2 | * | 4/2006 | Tetsuka | B62M 25/02 474/70 |
| 7,438,657 B2 | * | 10/2008 | Nakai | B62M 9/1342 474/80 |
| 8,663,043 B2 | * | 3/2014 | Auer | B62M 9/137 474/82 |

(Continued)

*Primary Examiner* — William E Dondero
*Assistant Examiner* — Mark K Buse
(74) *Attorney, Agent, or Firm* — Global IP Counselors, LLP

(57) ABSTRACT

A front derailleur is basically provided with a base member, a chain guide, a link mechanism and a cable guiding structure. The base member is fixedly coupled to a bicycle. The chain guide is configured to guide a chain. The link mechanism movably couples the chain guide to the base member between a retracted position and an extended position in response to movement of an operation cable. The link mechanism includes a cable attachment portion that is configured to be attached to the operation cable. The cable guiding structure guides the operation cable from the cable attachment portion. The cable guiding structure is disposed on at least one of the base member and the link mechanism. The cable guiding structure has a cable exit that is arranged such that the operation cable exits forwardly from the cable guiding structure towards the front of the bicycle.

12 Claims, 9 Drawing Sheets

(56) References Cited

U.S. PATENT DOCUMENTS

| | | | |
|---|---|---|---|
| 2003/0100393 A1* | 5/2003 | Nanko | B62M 9/1342 474/80 |
| 2004/0005950 A1* | 1/2004 | Tetsuka | B62M 25/02 474/80 |
| 2007/0135249 A1 | 6/2007 | Nanko | |
| 2011/0224037 A1* | 9/2011 | Auer | B62M 9/137 474/82 |
| 2014/0128189 A1* | 5/2014 | Kuwayama | B62M 9/1342 474/82 |

* cited by examiner

FRONT DERAILLEUR

CROSS-REFERENCE TO RELATED APPLICATIONS

This application is a continuation application of U.S. patent application Ser. No. 13/900,787 filed on May 23, 2013. The entire disclosure of U.S. patent application Ser. No. 13/900,787 is hereby incorporated herein by reference.

BACKGROUND

Field of the Invention

This invention generally relates to a bicycle front derailleur. More specifically, the present invention relates to a bicycle front derailleur providing a forward cable route therefrom.

Background Information

Generally, a front derailleur is operated by an operation cable that is coupled between a shifter and the front derailleur, and is mounted to a bicycle frame adjacent to front chain rings to shift a chain laterally between the chain rings. Depending on kind of cable routes, the front derailleur is referred to either as a top pull front derailleur or a bottom pull front derailleur. In the case of the top pull front derailleur, the operation cable usually runs in an upward direction along a rear side of a seat tube of the bicycle frame, and then curves forwardly and runs along an upper side of a top tube of the bicycle frame towards a handlebar where the shifter is provided. In the case of the bottom pull front derailleur, the operation cable usually runs in a downward direction along a rear side of the seat tube, and then curves under a hanger tube of the bicycle frame in a forward and upward direction where the operation cable runs along the underside of a down tube of the bicycle frame towards the handlebar.

SUMMARY

One aspect is to provide a front derailleur having a cable route with a cable exit that reduces the bending curvature of the cable between a shifter and the front derailleur.

In accordance with a first aspect of the present disclosure, a front derailleur is provided that is attachable to a bicycle with a crank axis and a rear wheel axis parallel to the crank axis. The front derailleur basically comprises a base member, a chain guide, a link mechanism and a cable guiding structure. The base member is configured to be fixedly coupled to the bicycle. The chain guide is configured to guide a chain. The link mechanism movably couples the chain guide to the base member between a retracted position and an extended position in response to movement of an operation cable. The link mechanism includes a cable attachment portion that is configured to be attached to the operation cable. The cable guiding structure is configured to guide the operation cable from the cable attachment portion. The cable guiding structure is disposed on at least one of the base member and the link mechanism. The cable guiding structure has a cable exit that is arranged such that the operation cable exits forwardly from the cable guiding structure within a sector having an angle of 150 degrees around the crank axis from an upper radius lying in a first plane that is perpendicular to a second plane containing the crank axis and the rear wheel axis.

In accordance with a second aspect of the present invention, the front derailleur according to the first aspect is configured so that the base member includes the cable guiding structure.

In accordance with a third aspect of the present invention, the front derailleur according to the first aspect is configured so that the link mechanism includes the cable guiding structure.

In accordance with a fourth aspect of the present invention, the front derailleur according to the first aspect is configured so that the cable guiding structure includes a first cable guiding portion formed in the base member, and a second cable guiding portion formed in the link mechanism.

In accordance with a fifth aspect of the present invention, the front derailleur according to the fourth aspect is configured so that the first cable guiding portion is formed as first cable guiding bore, and the second cable guiding portion is formed as second cable guiding bore.

In accordance with a sixth aspect of the present invention, the front derailleur according to the first aspect is configured so that the cable guiding structure includes a first cable guiding bore having a first bore section which has a first diameter and a second bore section which has a second diameter being smaller than the first diameter. The first bore section is arranged closer to the cable exit than the second bore section.

In accordance with a seventh aspect of the present invention, the front derailleur according to the sixth aspect is configured so that the operation cable includes an outer casing and an inner cable passing through the outer casing. The first bore section of the first cable guiding bore receives the outer casing.

In accordance with an eighth aspect of the present invention, the front derailleur according to the seventh aspect is configured so that the cable guiding structure further includes an insert sleeve inserted in the first cable guiding bore. The first bore section of the first cable guiding bore receives the outer casing via the insert sleeve.

In accordance with a ninth aspect of the present invention, the front derailleur according to the sixth aspect is configured so that the cable guiding structure further includes a second cable guiding bore. The first cable guiding bore is formed in the base member. The second cable guiding bore is formed in the link mechanism.

In accordance with a tenth aspect of the present invention, the front derailleur according to the first aspect is configured so that the link mechanism is pivotally coupled between the chain guide and the base member and moves away from the base member in a rearward direction as the chain guide moves from the retracted position to the extended position in response to the movement of the operation cable.

In accordance with an eleventh aspect of the present invention, the front derailleur according to the first aspect is configured so that the link mechanism includes a first link pivotally coupled between the base member and the chain guide, and a second link pivotally coupled between the base member and the chain guide. The first link includes the cable attachment portion.

In accordance with a twelfth aspect of the present invention, the front derailleur according to the first aspect is configured so that the first link further includes a lateral protruding part having a cable guiding bore of the cable guiding structure.

In accordance with a thirteenth aspect of the present invention, the front derailleur according to the twelfth aspect is configured so that the first link is arranged closer to a vertical center plane of a bicycle frame than the second link while the front derailleur is installed on the bicycle frame.

In accordance with a fourteenth aspect of the present invention, the front derailleur according to the thirteenth aspect is configured so that the first and second links move away from the base member in a rearward direction as the chain guide moves from the retracted position to the extended position in response to the movement of the operation cable.

In accordance with a fifteenth aspect of the present invention, the front derailleur according to the thirteenth aspect is configured so that the cable exit of the cable guiding structure is arranged forwardly of a downstream end of the chain guide while the front derailleur is installed on the bicycle.

In accordance with a sixteenth aspect of the present disclosure, a front derailleur is provided that is attachable to a bicycle with a crank axis and a rear wheel axis parallel to the crank axis. The front derailleur basically comprises a base member, a chain guide, a link mechanism and a cable guiding structure. The base member is configured to be fixedly coupled to the bicycle. The chain guide is configured to guide a chain. The link mechanism movably couples the chain guide to the base member between a retracted position and an extended position in response to movement of an operation cable. The link mechanism includes a cable attachment portion that is configured to be attached to the operation cable. The cable guiding structure is configured to guide the operation cable from the cable attachment portion. The cable guiding structure is disposed on at least one of the base member and the link mechanism. The cable guiding structure has a cable exit that is arranged at a front side of the bicycle with respect to a downstream end of the chain guide.

In accordance with a seventeenth aspect of the present invention, the front derailleur according to the sixteenth aspect is configured so that the base member includes the cable guiding structure.

In accordance with an eighteenth aspect of the present invention, the front derailleur according to the sixteenth aspect is configured so that the link mechanism includes the cable guiding structure.

In accordance with a nineteenth aspect of the present invention, the front derailleur according to the sixteenth aspect is configured so that the cable guiding structure includes a first cable guiding portion formed in the base member, and a second cable guiding portion formed in the link mechanism.

In accordance with a twentieth aspect of the present invention, the front derailleur according to the nineteenth aspect is configured so that the first cable guiding portion is formed as first cable guiding bore, and the second cable guiding portion is formed as second cable guiding bore.

In accordance with a twenty-first aspect of the present invention, the front derailleur according to the sixteenth aspect is configured so that the cable guiding structure includes a first cable guiding bore having a first bore section which has a first diameter and a second bore section which has a second diameter being smaller than the first diameter. The first bore section is arranged closer to the cable exit than the second bore section.

In accordance with a twenty-second aspect of the present invention, the front derailleur according to the twenty-first is configured so that the operation cable includes an outer casing and an inner cable passing through the outer casing. The first bore section of the first cable guiding bore receives the outer casing.

In accordance with a twenty-third aspect of the present invention, the front derailleur according to the twenty-second aspect is configured so that the cable guiding structure further includes an insert sleeve inserted in the first cable guiding bore. The first bore section of the first cable guiding bore receives the outer casing via the insert sleeve.

In accordance with a twenty-fourth aspect of the present invention, the front derailleur according to the twenty-first aspect is configured so that the cable guiding structure further includes a second cable guiding bore. The first cable guiding bore is formed in the base member. The second cable guiding bore is formed in the link mechanism.

In accordance with a twenty-fifth aspect of the present invention, the front derailleur according to the sixteenth aspect is configured so that the link mechanism is pivotally coupled between the chain guide and the base member and moves away from the base member in a rearward direction as the chain guide moves from the retracted position to the extended position in response to the movement of the operation cable.

In accordance with a twenty-sixth aspect of the present invention, the front derailleur according to the sixteenth aspect is configured so that the link mechanism includes a first link pivotally coupled between the base member and the chain guide, and a second link pivotally coupled between the base member and the chain guide. The first link includes the cable attachment portion.

In accordance with a twenty-seventh aspect of the present invention, the front derailleur according to the sixteenth aspect is configured so that the first link further includes a lateral protruding part having a cable guiding bore of the cable guiding structure.

In accordance with a twenty-eighth aspect of the present invention, the front derailleur according to the twenty-seventh aspect is configured so that the first link is arranged closer to a vertical center plane of a bicycle frame than the second link while the front derailleur is installed on the bicycle frame.

In accordance with a twenty-ninth aspect of the present invention, the front derailleur according to the twenty-eighth aspect is configured so that the first and second links move away from the base member in a rearward direction as the chain guide moves from the retracted position to the extended position in response to the movement of the operation cable.

Other objects, features, aspects and advantages of the disclosed front derailleur will become apparent to those skilled in the art from the following detailed description, which, taken in conjunction with the annexed drawings, discloses one embodiment of the front derailleur.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
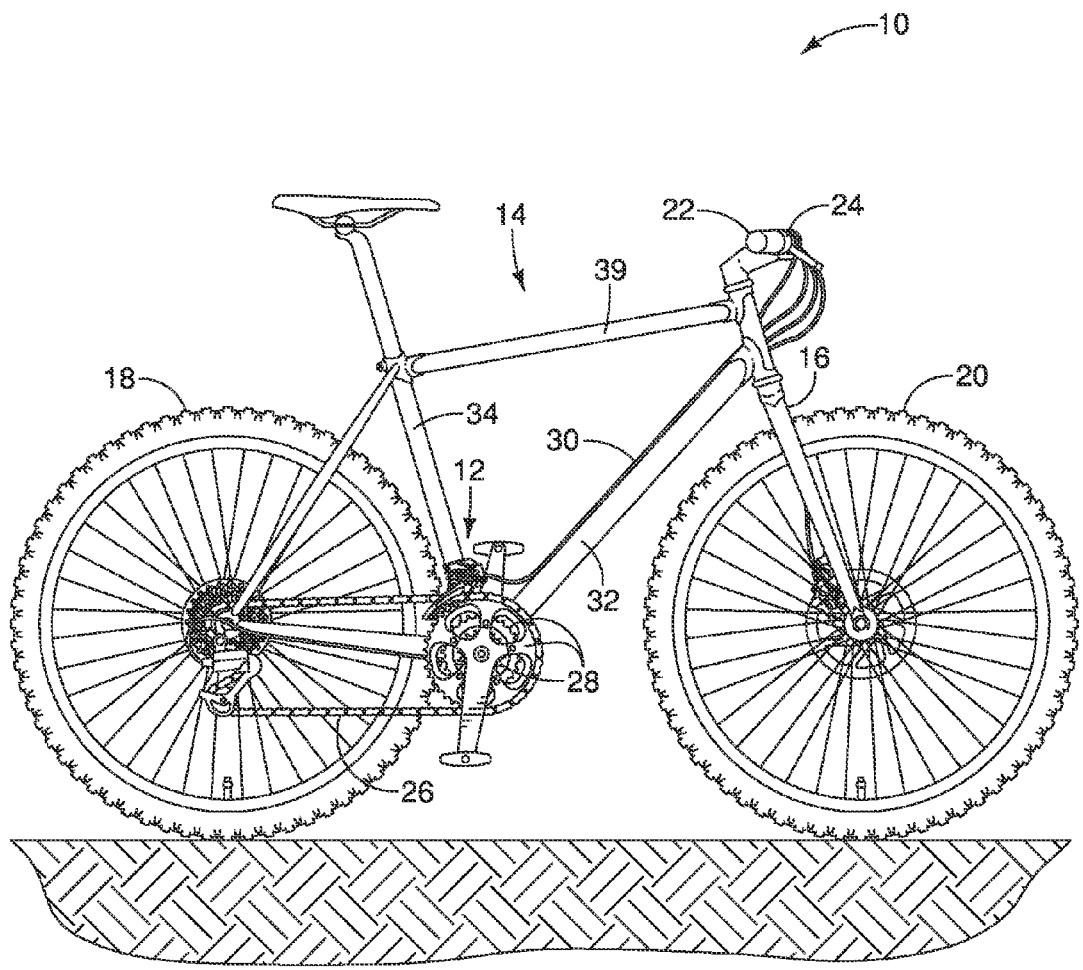
FIG. 1 is a side elevational view of a bicycle that is equipped with a front derailleur in accordance with one illustrated embodiment.

Referring initially to FIG. 1, a bicycle 10 is illustrated that is equipped with a front derailleur 12 in accordance with a first embodiment. As explained below, the front derailleur 12 is attachable to the bicycle 10 in detachable and reinstallable manner. Basically, the bicycle 10 includes a bicycle frame 14, a front fork 16, a rear wheel 18, a front wheel 20 and a handlebar 22. The handlebar 22 is attached to a steerer tube or steering column of the front fork 16. In the illustrated embodiment, a shifter 24 is attached to the handlebar 22 for operating the front derailleur 12 to laterally shift a chain 26 between three front sprockets or chain rings 28. The shifter 24 is operatively connected to the front derailleur by an operation cable 30. It will be apparent to those skilled in the bicycle field from this disclosure that any shifter can be used that uses an operation cable, such as the operation cable 30, to operate the front derailleur 12. Here, the shifter 24 is illustrated on the right side of the handlebar 22. However, the shifter 24 can be provided on either the left or right side of the handlebar 22 for operating the front derailleur 12 as need and/or desired.

Figure 2:
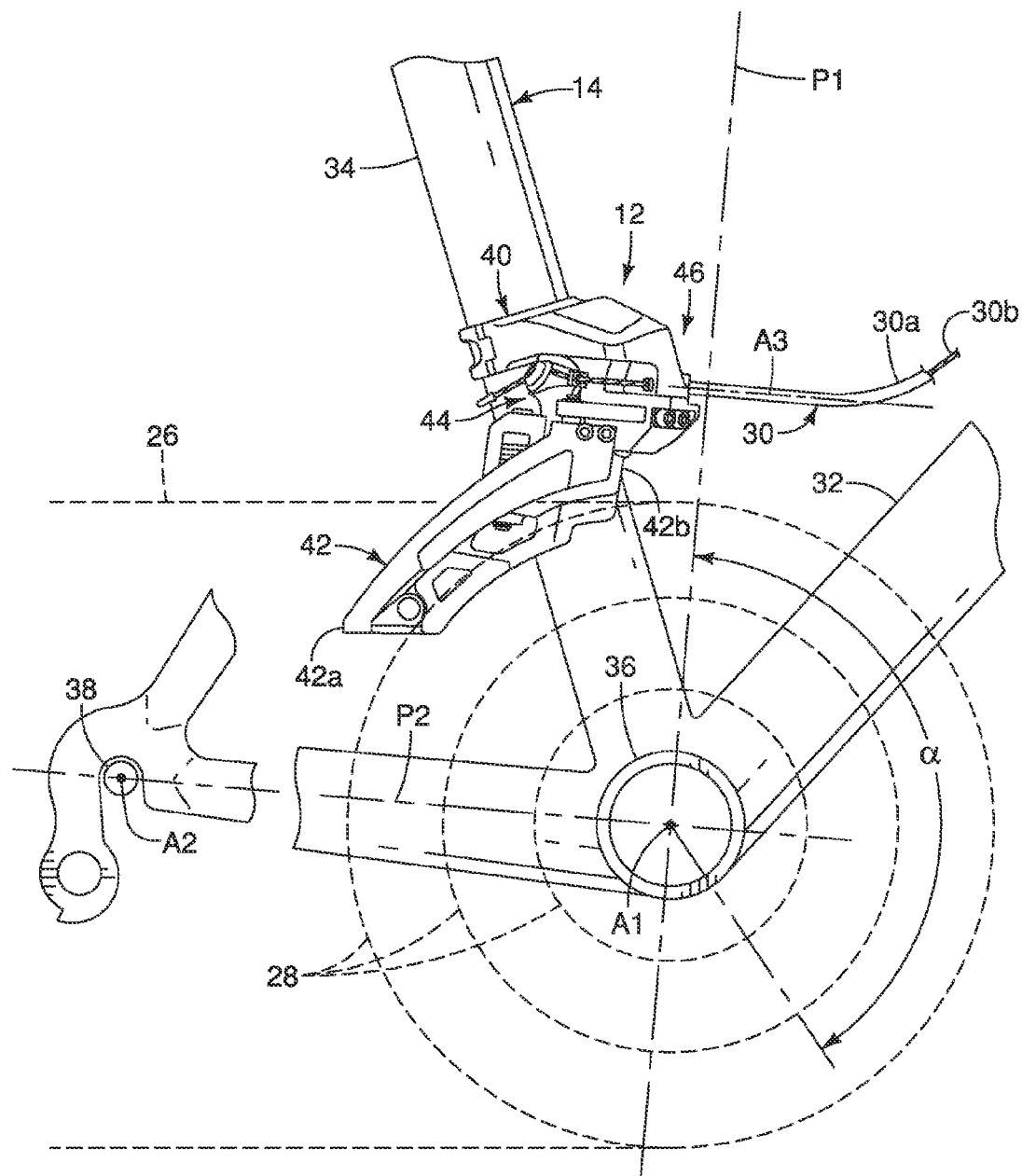
FIG. 2 is an enlarged outer side elevational view of a portion of the bicycle in the area of the front derailleur.
Figure 3:
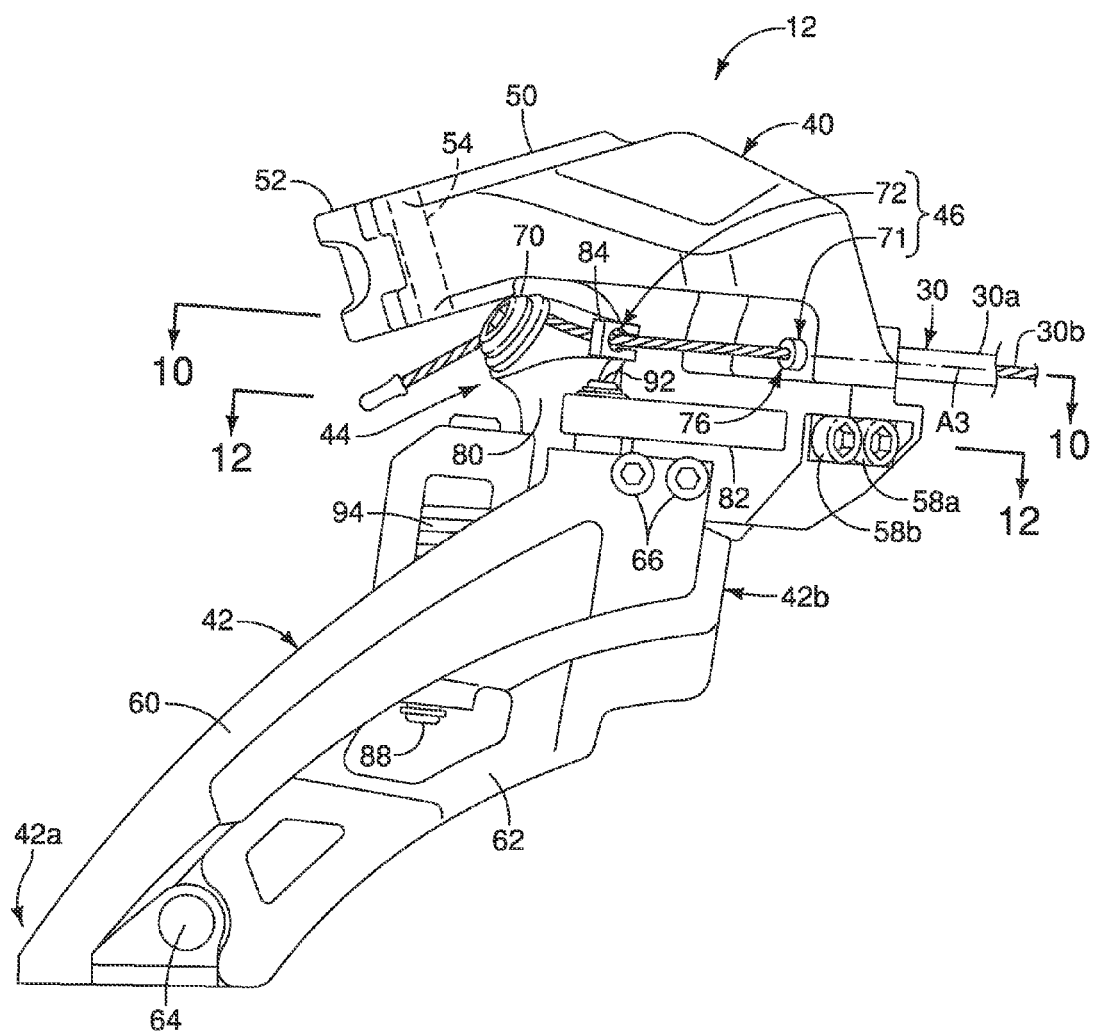
FIG. 3 is a side elevational view of the front derailleur in accordance with the illustrated embodiment, with an operation cable.

Referring to FIGS. 2 and 3, preferably, the operation cable 30 includes an outer casing 30a and an inner cable 30b passing through the outer casing 30a. Thus, in the illustrated embodiment, the operation cable 30 is a conventional Bowden cable. The inner cable 30b is slidably disposed inside the outer casing 30a. In particular, operation of the shifter 24 moves (i.e., pulls or releases) the inner cable 30b inside the outer casing 30a to operate the front derailleur 12. The outer casing 30a can be formed as a single continuous tubular member with one end contacting a part of the shifter 24 and the other ending connecting the front derailleur 12, as illustrated. Alternatively, the outer casing 30a can be formed of two or more pieces as is commonly done on many bicycles. The operation cable 30 is attached to a down tube 32 of the bicycle frame 14 in a conventional manner as seen FIG. 1.

The bicycle 10 can be any type of bicycle and can have a variety of configurations. Since bicycles and their various components are well known in the bicycle field, the following specification does not include detailed descriptions and illustrations regarding the bicycle 10 and its various components other than the front derailleur 12 of the present invention and the components or parts related to the front derailleur 12. In other words, this specification describes and/or illustrates only the front derailleur 12 and the components or parts of the bicycle 10 that is related to the front derailleur 12.

In the illustrated embodiment, as seen in FIGS. 1 and 2, the front derailleur 12 that is mounted on a seat tube 34 of the bicycle frame 14. However, it will be apparent to those skilled in the bicycle field from this disclosure that the front derailleur 12 can be attached to a hanger tube 36 of the bicycle frame 14 by a bottom bracket or other mounting structure, if needed and/or desired. As seen in FIG. 2, the bicycle 10 has a crank axis A1 and a rear wheel axis A2 which is parallel to the crank axis A1. The crank axis A1 is defined by a hanger tube 36 of the bicycle frame 14. In other words, the crank axis A1 corresponds to a center longitudinal axis of the hanger tube 36 and thus also corresponds to the center of rotation of the chain rings 28. As seen in FIG. 2, the rear wheel axis A2 is defined by a center axle 38 of the rear wheel 18.

As seen in FIG. 2, the front derailleur 12 is configured such that the operation cable 30 exits forwardly from the front derailleur 12 along a cable exit axis A3, which is explained below. The cable exit axis A3 extends from the front derailleur 12 such that the cable exit axis A3 enters into a sector of the bicycle frame 14 having an angle α of 150 degrees as measured around the crank axis A1 from an upper radius lying in a first plane P1 that is perpendicular to a second plane P2 containing the crank axis A1 and the rear wheel axis A2. The first and second planes P1 and P2 are reference planes that are perpendicular to a vertical center plane CP (see FIGS. 8 and 9). The vertical center plane CP as used herein refers to a plane that extends vertically while the bicycle is in an upright position on flat ground and that bisects the bicycle frame 14 into two lateral sections.

With this illustrated embodiment, a transmission efficiency of the operation cable 30 from the shifter 24 to the front derailleur 12 can be improved compared to a conventional top pull cable route that the operation cable 30 usually runs in an upward direction along a rear side of the seat tube 34 from a top pull front derailleur, and then curves forwardly and runs along an upper side of a top tube 39 (FIG. 1) of the bicycle frame 14 towards the handlebar 22. Further, the transmission efficiency of the operation cable 30 from the shifter 24 to the front derailleur 12 can be improved compared to a conventional bottom pull cable route that the operation cable 30 usually runs in a downward direction along the rear side of the seat tube 34, and then curves under a hanger tube 36 in a forward and upward direction where the operation cable 30 runs along the underside of the down tube 32 towards the handlebar 22. For example, by using the front derailleur 12, a cable pulling load of the operation cable 30 at the shifter 24 can decrease by about ten to fifteen percent relative to the conventional top and bottom pull front derailleurs.

Referring now to FIGS. 3 to 12, the front derailleur 12 will now be described in more detail. The front derailleur 12 basically comprises a base member 40, a chain guide 42, a link mechanism 44 and a cable guiding structure 46. The base member 40 is configured to be fixedly coupled to the bicycle 10. The chain guide 42 is configured to guide a chain 26. The link mechanism 44 movably couples the chain guide 42 to the base member 40 between a retracted position (FIG. 8) and an extended position (FIG. 9) in response to movement of the operation cable 30. In particular, the chain guide 42 is moved relative to the base member 40 in an outward direction away from the bicycle frame 14 by pulling the inner cable 30b of the operation cable 30, and is moved relative to the base member 40 in an inward direction towards the bicycle frame 14 by releasing the inner cable 30b of the operation cable 30. In this way, the chain guide 42 selectively positions the bicycle chain 26 over one of the chain rings 28 in response to the operation of the shifter 24.

In the illustrated embodiment, the base member 40 is disposed above the chain guide 42 while the front derailleur 12 in the installed position on the seat tube 34. Of course, it will be apparent to those skilled in the bicycle field from this disclosure that the base member 40 can have other configurations as needed and/or desired. For example, the base member 40 could be attached to the hanger tube 36 by the bottom bracket if needed and/or desired.

Figure 4:
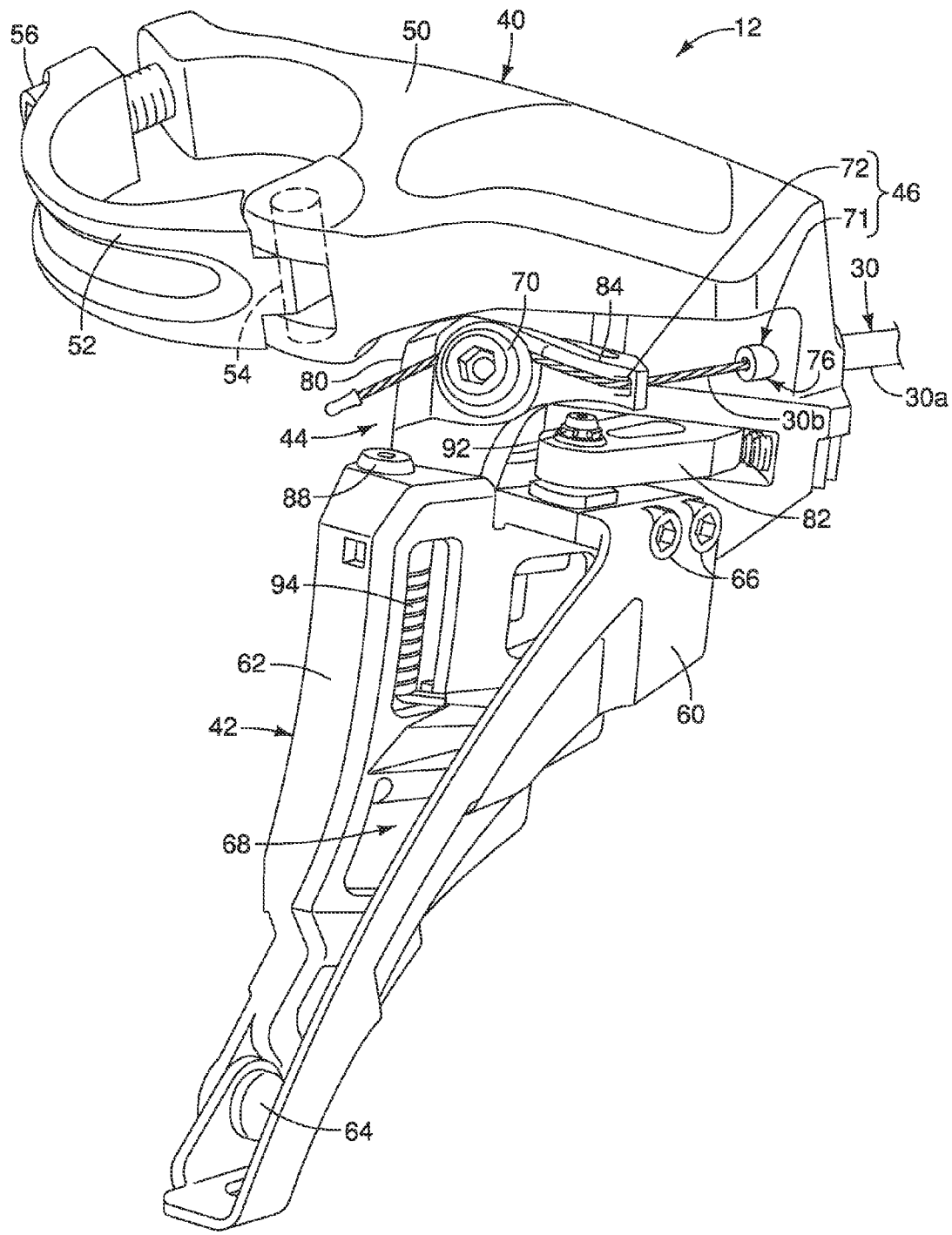
FIG. 4 is a rear perspective view of the front derailleur in accordance with the illustrated embodiment, with the operation cable.
Figure 5:
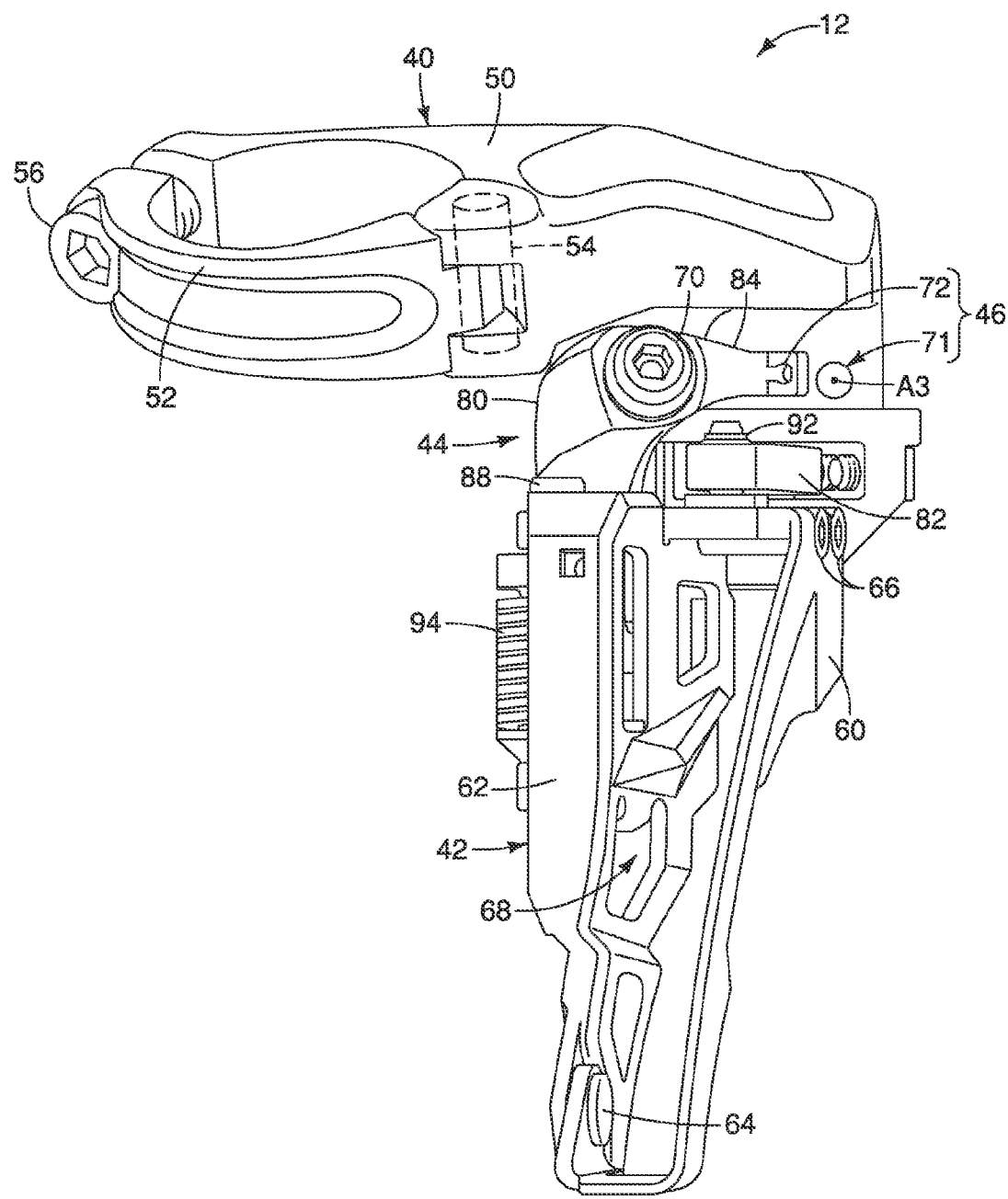
FIG. 5 is another rear perspective view, similar to FIG. 4, of the front derailleur in accordance with the illustrated embodiment, but with the operation cable removed.

The base member 40 is a rigid member that is fixedly coupled to the seat tube 34 of the bicycle frame 14. Typically, the base member 40 is made of a metal material or a fiber reinforced material. As seen in FIGS. 4 and 5, in the illustrated embodiment, the base member 40 is a hinge type band clamp that includes a first band clamp portion 50 and a second band clamp portion 52. A hinge pin 54 hingedly connects first ends of the first and second band clamp portions 50 and 52 together, while second ends of the first and second band clamp portions 50 and 52 are fastened together by a fastener 56. Here, the fastener 56 includes a bolt and a nut that are used to draw the second ends of the first and second band clamp portions 50 and 52 together for clamping onto the seat tube 34 of the bicycle frame 14 in a detachable and reinstallable manner.

Figure 6:
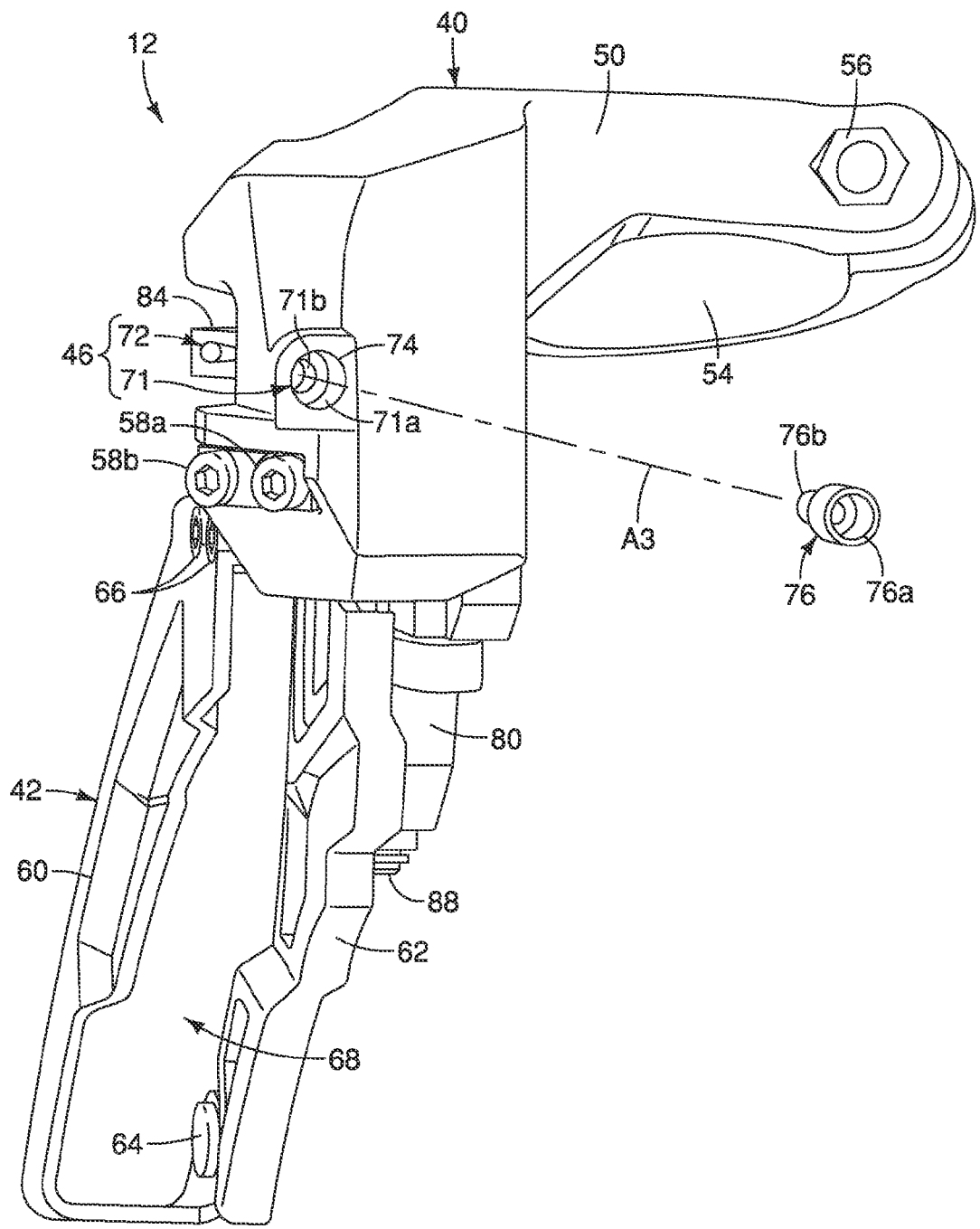
FIG. 6 is a front perspective view of the front derailleur in accordance with the illustrated embodiment, with the operation cable removed.
Figure 12:
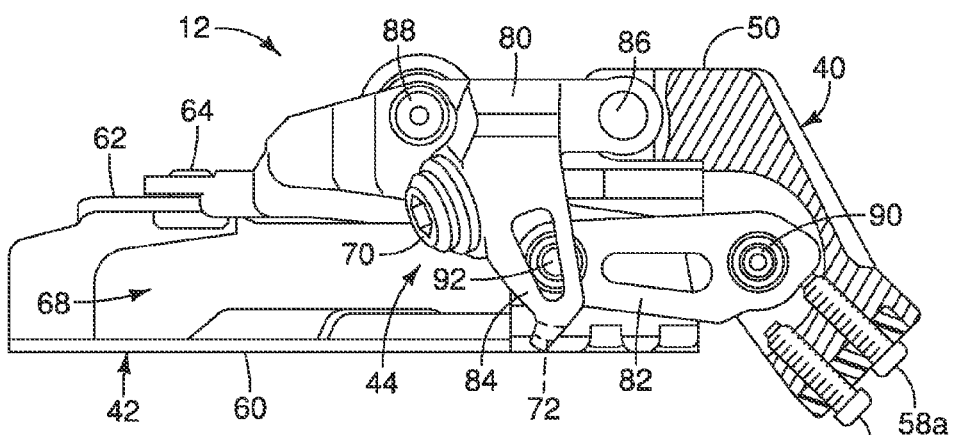
FIG. 12 is a cross-sectional view of the front derailleur as seen along section line 12-12 of FIG. 3.

As best seen in FIGS. 6 and 12, the first band clamp portion 50 of the base member 40 includes a low shift stage adjustment screw 58a and a top shift stage adjustment screw 58b that finely adjusts the low and top shift stage positions of the chain guide 42. In other words, the low shift stage adjustment screw 58a is configured and arranged to change the low shift stage position of the chain guide 42 relative to the base member 40, while the top shift stage adjustment screw 58b is configured and arranged to change the top shift stage position of the chain guide 42 relative to the base member 40.

Figure 7:
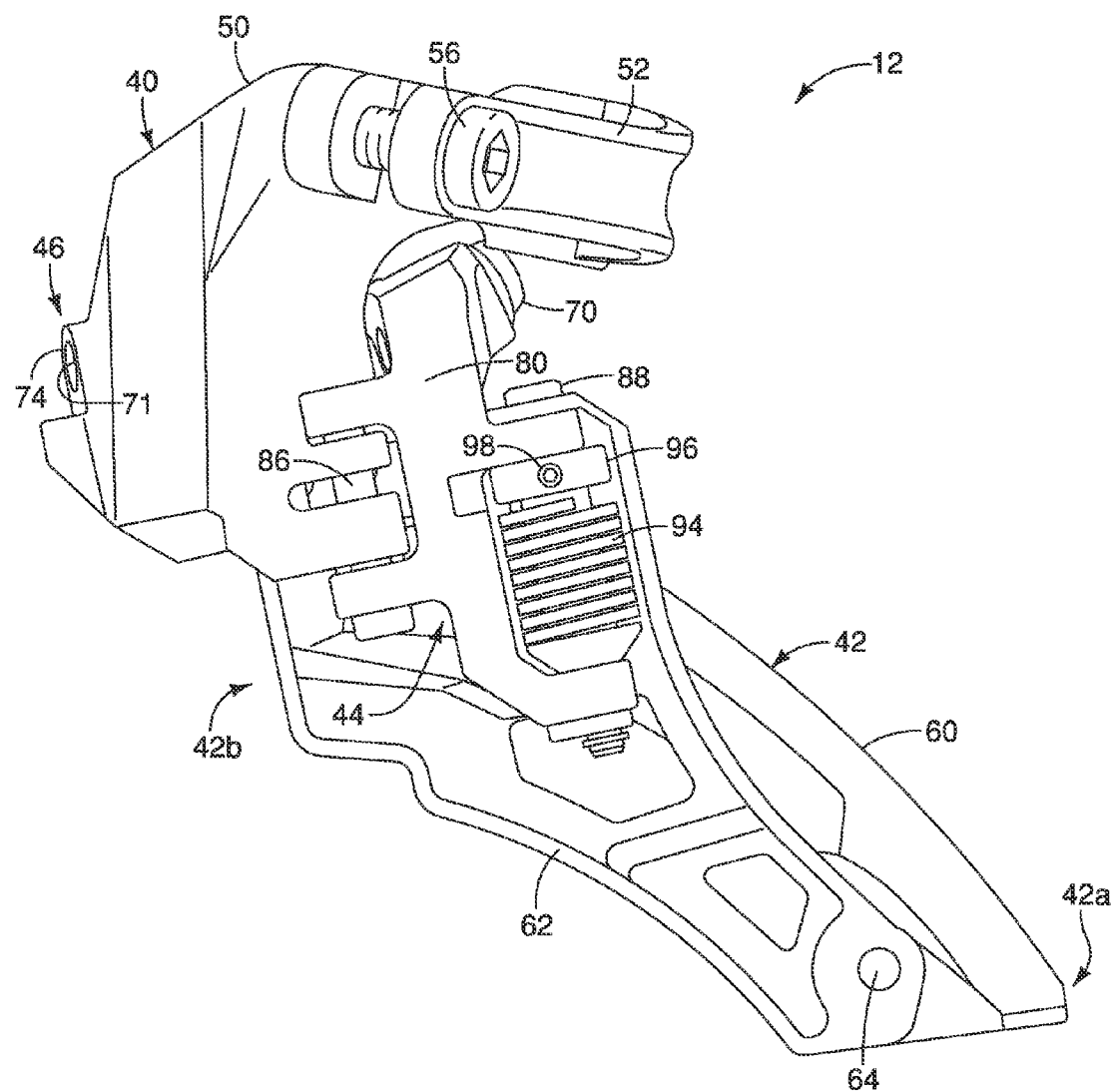
FIG. 7 is an inner side elevational view of the front derailleur in accordance with the illustrated embodiment, with the operation cable removed.

As shown in FIGS. 3 to 7, the chain guide 42 basically includes a first guide plate 60 and a second guide plate 62. The chain guide 42 is movably supported to the base member 40 by the link mechanism 44 for movement between the retracted position (FIG. 8) and the extended position (FIG. 9) relative to the base member 40 in response to movement of the operation cable 30 as mentioned above. As seen in FIGS. 3 and 7, the chain guide 42 has an upstream end 42a and a downstream end 42b. The terms "upstream" and "downstream" as used herein mean with respect to the movement of the chain 26 during pedaling. An upstream end of the first guide plate 60 is attached to an upstream end of the second guide plate 62 by a fastener 64 (e.g., a rivet). A downstream end of the first guide plate 60 is attached to a downstream end of the second guide plate 62 by two fasteners 66 (e.g., bolts). The first guide plate 60 contacts and laterally shifts the bicycle chain 26 such that the bicycle chain 26 moves in an inward direction with respect to the bicycle frame 14 between the chain rings 28. Similarly, the second guide plate 62 contacts and laterally shifts the bicycle chain 26 such that the bicycle chain 26 moves in an outward direction with respect to the bicycle frame 14 between the chain rings 28. The inner surfaces of the first and second guide plates 60 and 62 that face each other form a chain receiving slot 68 therebetween for receiving the chain 26.

As best seen in FIGS. 3 and 5, the link mechanism 44 includes a cable attachment portion 70 that is configured to be attached to the inner cable 30b of the operation cable 30. The cable guiding structure 46 is configured to guide the operation cable 30 from the cable attachment portion 70 towards at a front side of the bicycle with respect to a downstream end 42 b of the chain guide 42. The cable guiding structure 46 is disposed on at least one of the base member 40 and the link mechanism 44, as explained below. In either case, the operation cable 30 preferably extends in a more forward direction than a conventional cable guiding structure in which the operation cable extends upwardly or downwardly along the seat tube 34. In the illustrated embodiment, as explained below, the base member 40 includes a first part of the cable guiding structure 46, and the link mechanism 44 includes a second part of the cable guiding structure 46. In particular, the cable guiding structure 46 includes a first cable guiding portion that is formed in the base member 40 and a second cable guiding portion that is formed in the link mechanism 44. The first cable guiding portion is provided as a first cable guiding bore 71 and the second cable guiding portion is provided as a second cable guiding bore 72. Namely, the first cable guiding bore 71 is formed in the base member 40. The second cable guiding bore 72 is formed in the link mechanism 44. However, it will be apparent to those skilled in the bicycle field from this disclosure that the front derailleur 12 of the illustrated embodiment can be modified such that the cable guiding structure 46 is only formed on one of the base member 40 and the link mechanism 44 as needed and/or desired. Further, it will be apparent to those skilled from this disclosure that the first and second guiding portion can be formed as any suitable shapes in addition to bore, for example recess or groove, so as to guide the operation cable 30.

The cable guiding structure 46 has a cable exit 74 that is arranged such that the operation cable 30 exits forwardly from the cable guiding structure 46 within a sector having an angle of 150 degrees around the crank axis A1 from the upper radius lying in the first plane P1 that is perpendicular to the second plane P2 containing the crank axis A1 and the rear wheel axis A2, while the front derailleur 12 is installed on the bicycle 10. The cable exit 74 of the cable guiding structure 46 is arranged at a front side of the bicycle 10 with respect to the downstream end 42b of the chain guide 42. The cable exit 74 of the cable guiding structure 46 is arranged forwardly of the downstream end 42b of the chain guide 42 while the front derailleur 12 is installed on the bicycle 10.

Figure 10:
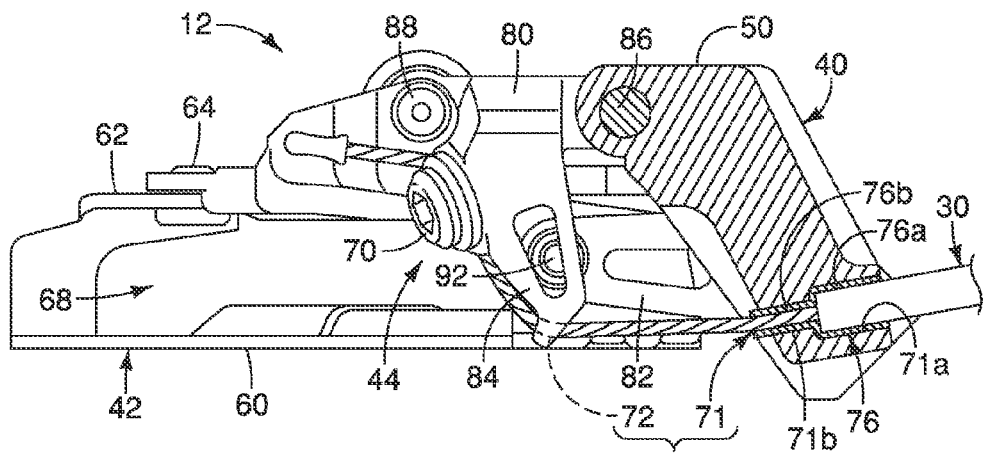
FIG. 10 is a cross-sectional view of the front derailleur as seen along section line 10-10 of FIG. 3.
Figure 11:
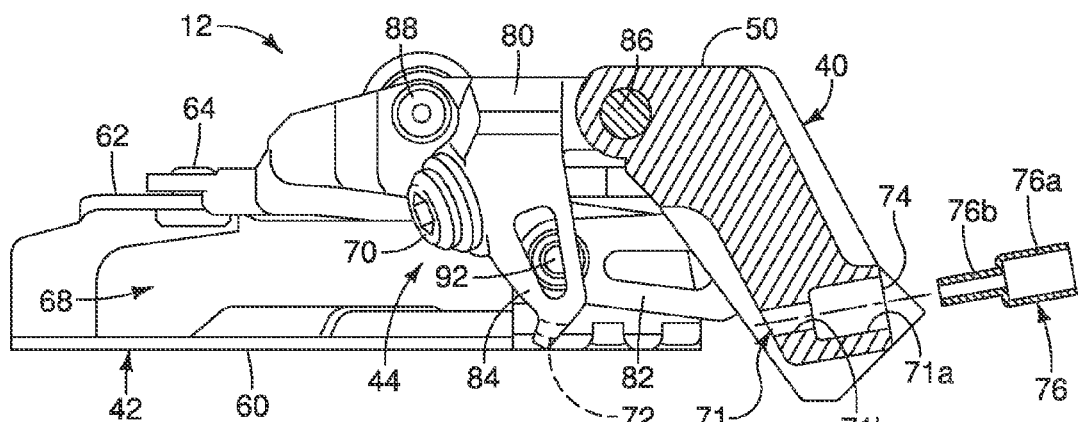
FIG. 11 is a cross-sectional view of the front derailleur, similar to FIG. 10, as seen along section line 10-10 of FIG. 3, but with the operation cable removed.

Optionally, the cable guiding structure 46 further includes an insert sleeve 76. The insert sleeve 76 is preferably formed of a material having a coefficient of friction that is lower than the material of the base member 40 that defines the first cable guiding bore 71. For example, the insert sleeve 76 can be made of polytetrafluoroethylene or other suitable material that has a low coefficient of friction. The insert sleeve 76 is inserted in the first cable guiding bore 71. As seen in FIGS. 10 and 11, in the illustrated embodiment, the first cable guiding bore 71 has a first bore section 71a and a second bore section 71b. The first bore section 71a has a first diameter D1 that is dimension to receive the outer casing 30a. The second bore section 71b has a second diameter D2 that is smaller than the first diameter D1 that is dimension to receive the inner cable 30b. The first bore section 71a is arranged closer to the cable exit 74 than the second bore section 71b. In the illustrated embodiment, the first bore section 71a of the first cable guiding bore 71 receives the outer casing 30b via the insert sleeve 76. Preferably, the insert sleeve 76 includes a first sleeve section 76a and a second sleeve section 76b. The first sleeve section 76a is disposed in the first bore section 71a, while the second sleeve section 76b is disposed in the second bore section 71b.

Figure 8:
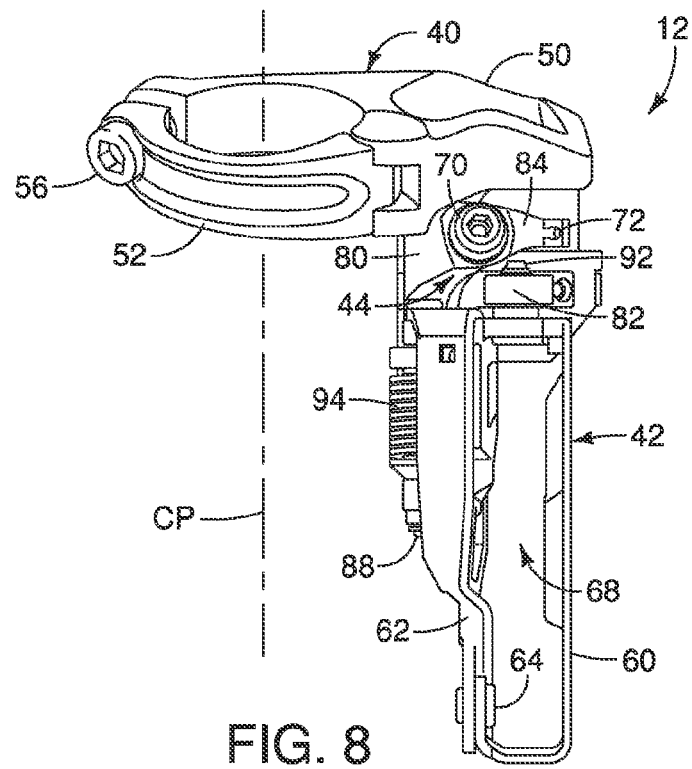
FIG. 8 is a rear view of the front derailleur in accordance with the illustrated embodiment with the chain guide in the retracted position.

The link mechanism 44 is pivotally coupled between the chain guide 42 and the base member 40 and moves away from the base member 40 in a rearward direction as the chain guide 42 moves from the retracted position (FIG. 8) to the extended position (FIG. 9) in response to the movement of the operation cable 30. In the illustrated embodiment, the chain guide 42 has two extended positions with respect to the retracted position (FIG. 8). In other words, in the illustrated embodiment, the chain guide 42 is movably mounted relative to the base member 40 between a low shift stage position (i.e. the retracted position shown in FIG. 8), a middle shift stage position and a top shift stage position.

The link mechanism 44 further includes a first link 80 that is pivotally coupled between the base member 40 and the chain guide 42, and a second link 82 that is pivotally coupled between the base member 40 and the chain guide 42. The first link 80 includes the cable attachment portion 70. The cable attachment portion 70 of the first link 80 is basically configured by a head portion of a bolt that is screwed into a threaded bore of the first link 80 and a portion which faces the head portion of the bolt at the first link 80 for attaching the inner cable 30b to the first link 80. When the first link 80 is pulled or released by movement of the inner cable 30b of the operation cable 30, the chain guide 42 is moved between the retracted position and the extended position for moving the bicycle chain 26 between the chain rings 28.

The first link 80 further includes a lateral protruding part 84 that has the second cable guiding bore 72 of the cable guiding structure 46. As best seen in FIG. 12, the first link 80 has a first end that is pivotally attached to the base member 40 by a pivot pin 86. The first link 80 has a second end that is pivotally attached to the chain guide 42 by a pivot pin 88. The second link 82 has a first end that is pivotally attached to the base member 40 by a pivot pin 90. The second link 82 has a second end that is pivotally attached to the chain guide 42 by a pivot pin 92. The pivot pins 86, 88, 90 and 92 have generally parallel axes. The pivot pins 86, 88, 90 and 92 are approximately vertical axes in an installed position with the bicycle 10 in an upright position on a horizontal surface. The base member 40, the chain guide 42 and the first and second links 80 and 82 form a four-bar linkage. The pivot pins 86, 88, 90 and 92 are preferably spaced apart from one another in a vertical direction with respect to the base member 40 in an installed position with the bicycle 10 in an upright position on a horizontal surface.

Figure 9:
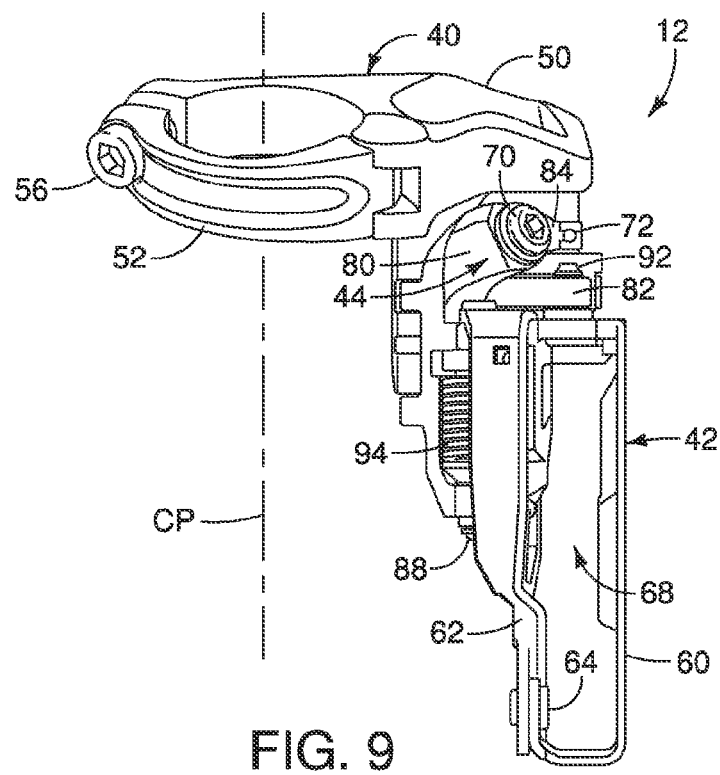
FIG. 9 is a rear view of the front derailleur in accordance with the illustrated embodiment with the chain guide in one of the extended positions.

As seen in FIGS. 8 and 9, the first link 80 is arranged closer to a vertical center plane CP of the bicycle frame 14 than the second link 82 while the front derailleur 12 is installed on the bicycle frame 14. In the other words, the first link 80 is an inner link and the second link 82 is an outer link. Since the pivot pins 86, 88, 90 and 92 have their axes arranged in a generally vertical direction, the first and second links 80 and 82 move away from the base member 40 in a rearward direction of the bicycle 10 as the chain guide 42 moves from the retracted position to the extended position in response to the movement of the operation cable 30.

In the illustrated embodiment, as seen in FIG. 7, the link mechanism 44 further includes a biasing member 94 that bias the chain guide 42 towards one of a low shift stage position and a top shift stage position. In the illustrated embodiment, the biasing member 94 is a torsion spring that biases the chain guide 42 towards the low shift stage position. The biasing member 94 has a coiled portion mounted on the pivot pin 88. A first end of the biasing member 94 is engaged with the second guide plate 62. For example, as in the illustrated embodiment, the first end of the biasing member 94 is hooked on the second guide plate 62. A second end of the biasing member 94 is fixed to an adjustment collar 96 that is fixed to the first link 80 via the pivot pin 88. The pivot pin 88 non-rotatably mounted to the first link 80. The adjustment collar 96 has a set screw 98 that engages the pivot pin 88 for fixing the adjustment collar 96 to the pivot pin 88. By fixing the adjustment collar 96 with the set screw 98 at different angular positions the biasing force of the biasing member 94 on the chain guide 42 can be varied.

As seen in FIG. 12, the end shift stage positions of the chain guide 42 with respect to the base member 40 are set by turning the low shift stage adjustment screw 58a and the top shift stage adjustment screw 58b. In this way, the range of movement of the chain guide 42 with respect to the base member 40. In particular, the low shift stage adjustment screw 58a contacts an abutment of the second link 82 of the link mechanism 44 when the chain guide 42 is located in the low shift stage (gear) position. The top shift stage adjustment screw 58b contacts an abutment of the second link 82 of the link mechanism 44 when the chain guide 42 is located in the top shift stage (gear) position.

While the cable routing aspect of the present invention has been applied to a front derailleur having a link mechanism in which link moves away from a base member in rearward direction, the cable routing aspect of the present invention is not limited to this arrangement of the link mechanism. For example, the cable routing aspect of the present invention can be adapted to a front derailleur having a link mechanism in which link moves away from a base member in ether a downward direction or an upward direction.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein, the following directional terms "forward", "rearward", "front", "rear", "above", "downward", "vertical", "horizontal", "below" and "transverse" as well as any other similar directional terms refer to those directions of a bicycle in an upright, riding position and equipped with the front derailleur 12. Accordingly, these directional terms, as utilized to describe the front derailleur 12 should be interpreted relative to a bicycle in an upright riding position on a horizontal surface and that is equipped with the front derailleur 12. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A front derailleur attachable to a bicycle having a crank axis and a rear wheel axis which is parallel to the crank axis, the front derailleur comprising:
a base member configured to be fixedly coupled to the bicycle to install the front derailleur on the bicycle;
a chain guide configured to guide a chain, the chain guide having an upstream end and a downstream end the downstream end being disposed forward of the upstream end in a longitudinal direction of the bicycle while the front derailleur is in an installed state on the bicycle;
a link mechanism movably coupling the chain guide to the base member between a retracted position and an extended position in response to movement of an operation cable; and
a cable guiding structure configured to guide the operation cable, the cable guiding structure including a cable exit that is arranged such that the operation cable exits forwardly from the cable guiding structure along a cable exit axis the cable exit axis extending into a sector having an angle of 150 degrees around the crank axis from a first plane that is perpendicular to a second plane containing the crank axis and the rear wheel axis while the front derailleur is in the installed state, the sector being disposed on a forward side of the first plane in the longitudinal direction of the bicycle and spanning angularly from a portion of the first plane disposed above the second plane toward a portion of the first plane disposed below the second plane in a side view of the bicycle, the cable exit being disposed above the crank axis while the front derailleur is in the installed state.

2. The front derailleur according to claim 1, wherein the cable guiding structure includes a first cable guiding portion formed in the base member.

3. The front derailleur according to claim 1, wherein the cable guiding structure includes a second cable guiding portion formed in the link mechanism.

4. The front derailleur according to claim 3, wherein the second cable guiding portion includes at least one of a bore, a recess, and a groove.

5. The front derailleur according to claim 3, wherein the link mechanism includes a first link and a second link that pivotally connect the chain guide to the base member, the first link including a lateral protruding part that has the second cable guiding portion.

6. The front derailleur according to claim 5, wherein the first link is arranged closer to a vertical center plane of the bicycle frame than the second link while the front derailleur is in the installed state.

7. A front derailleur comprising:
a base member configured to be fixedly coupled to a bicycle to install the front derailleur on the bicycle;
a chain guide configured to guide a chain, the chain guide having an upstream end and a downstream end, the downstream end being disposed forward of the upstream end in a longitudinal direction of the bicycle while the front derailleur is in an installed state on the bicycle;
a link mechanism movably coupling the chain guide to the base member between a retracted position and an extended position in response to a movement of an operation cable; and
a cable guiding structure configured to guide the operation cable, the cable guiding structure including a cable exit, a first cable guiding portion formed in the base member, and a second cable guiding portion formed in the link mechanism, the first cable guiding portion having a first bore section having a first diameter and a second bore section having a second diameter that is smaller than the first diameter, the first bore section being arranged closer to the cable exit than the second bore section, the cable exit being forward of the downstream end of the chain guide in the longitudinal direction of the bicycle while the front derailleur is in the installed state.

8. The front derailleur according to claim 7, wherein the first diameter is dimensioned to receive an outer casing of the operation cable, and the second diameter is dimensioned to receive an inner cable of the operation cable.

9. The front derailleur according to claim 7, wherein the cable guiding structure includes an insert sleeve that is inserted in the first cable guiding portion.

10. The front derailleur according to claim 9, wherein the insert sleeve includes a first sleeve section and a second sleeve section,
the first sleeve section is disposed in the first bore section, and
the second sleeve section is disposed in the second bore section.

11. The front derailleur according to claim 10, wherein the second sleeve section is partly disposed outside of the second bore section.

12. A front derailleur comprising:
a base member configured to be fixedly coupled to the bicycle to install the front derailleur on the bicycle;
a chain guide configured to guide a chain, the chain guide having an upstream end and a downstream end, the downstream end being disposed forward of the upstream end in a longitudinal direction of the bicycle while the front derailleur is in an installed state on the bicycle;
a link mechanism movably coupling the chain guide to the base member between a retracted position and an extended position in response to movement of an operation cable, the link mechanism including a first link and a second link, the first link and the second link pivotally connecting the chain guide to the base member via pivot pins that define approximately vertical axes while the front derailleur is in the installed state and the bicycle is in an upright position; and a cable guiding structure configured to guide the operation cable forward in the longitudinal direction of the bicycle while the front derailleur is in the installed state.

* * * * *